3,036,034
POLYETHYLENE AND POLYPROPYLENE STABILIZED WITH THIOSULPHATES
Gottfried E. Rumscheidt, Amsterdam, Netherlands, assignor to Shell Oil Company, New York, N.Y., a corporation of Delaware
No Drawing. Filed Jan. 29, 1960, Ser. No. 5,361
Claims priority, application Netherlands Apr. 29, 1959
13 Claims. (Cl. 260—45.7)

This invention relates to stabilized polymers of alpha monoolefins. More particularly, it relates to stabilized compositions and methods for stabilizing polymers of alpha-monoolefins prepared at low temperatures and pressures.

It is now well known that polymers of alpha-monoolefins can be prepared at lower temperatures and pressures in the presence of certain catalyst compositions which are commonly referred to as "Ziegler catalyst" or "low-pressure catalyst." Polymers produced by use of these catalysts are characterized by a high degree of regularity of their molecules and are termed isotactic, crystalline, linear, low-pressure, or "Ziegler" polymers.

Particularly useful low-pressure polymers are highly crystalline polyethylene and polypropylene. The polyethylene is a well known material. It is characterized by a relatively high density, compared to polyethylene produced in the high pressure process. The polypropylene is characterized, among other things, by a high melting point, i.e., in the order of about 170° C., improved tensile strength and the like. Although there are various ways of distinguishing this polypropylene from the prior art amorphous type of polypropylene, it is convenient to describe the isotactic or crystalline polymer as that which is insoluble in boiling heptane whereas amorphous polypropylene is soluble therein. Low-pressure polypropylene prepared with preferred Ziegler type catalysts contains as much as 90 to 98% crystalline, i.e., heptane insoluble polymer.

Like polymers obtained from other sources, the polymers of ethylenically unsaturated hydrocarbons prepared with the use of Ziegler catalysts generally show a gradual degradation when processed or stored. Degradation occurs particularly during exposure to elevated temperatures, such as may occur in milling, molding, or extrusion, and during prolonged exposure to light, such as may occur during use.

The stabilization to which this invention relates consists in the incorporation of compounds, which may be called stabilizers, in order to suppress undesired degradation and consequent changes in properties of polyolefins.

Various substances which are known to give satisfactory results as stabilizers for polymers obtained by high pressure polymerization with a peroxide catalyst have been found to be unsatisfactory in the case of low pressure polymers. One of the major differences between high pressure polymers and low pressure polymers is that the latter almost invariably contain significant traces of metallic catalysts. These catalyst residues can interact with some stabilizers to produce colored products or other undesirable effects.

It is an object of the invention to provide novel compositions of polymers of alpha-monoolefins. It is another object to provide stabilized compositions of polymers of alpha-monoolefins. It is a further object of this invention to provide polymers of alpha-monoolefins which have color stability and which have improved resistance to degradation during milling. It is yet another object of this invention to provide methods for stabilizing linear or crystalline polyethylene, polypropylene and other polyolefins. It is still another object of this invention to provide a method for substantially reducing or preventing the tendency of polyolefins to degrade during processing operations such as are carried out during the manufacture of articles therefrom, and also during the subsequent lifetime of such articles.

It has now been found that Ziegler type polymers of alpha-monoolefins can be stabilized against degradation by compounds which have not heretofore been suggested for such use. The stabilizing compounds which, when incorporated in a linear polyolefin, provide the novel compositions of this invention are esters and ester salts of thiosulfuric acid. They can be represented by the formula $(RS_2O_3)_nX$. In this formula X represents (1) hydrogen or (2) a metal from the group consisting of alkali metals, alkaline earth metals, zinc and cadmium or (3) an organic group R'. The letter $n$ represents an integer which is the same as the valence of X. Both R and R' are preferably alkyl groups and may be alkyl groups containing substituents such as aryl groups, hydroxy groups and halogen atoms. R and R' may also be cycloalkyl or aryl groups which may in turn be substituted with alkyl groups, hydroxy groups and halogen atoms. The compound $(RS_2O_3)_nX$ contains at least 6 carbon atoms and the groups R and R' may each contain from 3 to 20 or more carbon atoms. Among the metals, the alkali metals are preferred particularly sodium which is readily available and inexpensive. Zinc is preferred among the non-alkali metals.

Examples of suitable ester salts for use in this invention are sodium cetyl thiosulfate, potassium cetyl thiosulfate, sodium dodecyl thiosulfate, sodium thiosulfate, sodium hexyl thiosulfate, sodium betahydroxy cetyl thiosulfate, zinc cetyl thiosulfate and the like. The useful salts include the sodium, potassium, lithium, cesium, calcium, barium, zinc and cadmium salts of esters of thiosulfuric acid in which the organic group is an alkyl group such as n-hexane, 2-methyl pentane, 3-methyl pentane, a normal or branched alkyl group having from 7 through 20 carbon atoms, a normal alkyl group having a hydroxyl group in the beta position such as beta-hydroxy hexyl, -decyl, -cetyl, -octadecyl and the like, an aryl substituted alkane such as benzyl, a cyclohexane or substituted cyclohexane such as cyclohexyl or methylcyclohexyl and the like.

Examples of suitable esters are the thiosulfuric acid esters of terminal alcohols such as 1-propanol, 1-pentanol, 1-octanol, 1-dodecanol, 1-hexadecanol, 1-octadecanol and the like and of the other compounds leading to the hydrocarbyl groups described above as suitable in the thiosulfuric acid esters and salts.

The thiosulfuric acid esters and ester salts can be prepared by reacting organic halogen compounds such as alkyl halides or alkyl halohydrins with inorganic thiosulfates. The reaction is generally carried out in an alcoholic medium.

In the production of the higher molecular weight compounds, i.e., those in which the alkyl groups have more than 3 carbon atoms, the reaction is suitably carried out in ethylene glycol or in an aqueous methanol medium. The reaction is generally carried out at temperatures in the range of from 100° to 180° C., pressure being applied if necessary. The presence of a small amount of an alkaline material may increase the yield. In some cases the corresponding sulfite may be used together with sulfur instead of an inorganic thiosulfate. The salts of thiosulfuric acid are generally known as Bunte salts.

The above described stabilizers are used in this invention in amounts in the range of 0.01 to 1.0% wt. based on the polymer which is to be stabilized. The stabilizers may be employed with many other additives commonly used in polymer formulations without any adverse effects resulting therefrom. Typical of such additives are fillers, pigments and dyes.

The stabilizers of this invention are easily incorporated into the polymer formulations by any known blending techniques such as dry blending or milling.

It is sometimes of advantage to combine the stabilizers of this invention with other stabilizers such as sulfur or phenolic stabilizers. Particularly useful phenolic stabilizers for such uses are for example 2,5-di-tertiary-butyl-4-methoxy phenol, 2,6-di-tertiary-butyl-4-methoxy phenol, 2,4,6-tri-tertiary-butyl phenol and 2-methyl-4,6-di-tertiary-butyl phenol. Other suitable phenolic compounds are condensation products of monocyclic monohydric phenols with cyclic terpenes. Typical of these is the compound ordinarily designated oxycresyl camphene and compounds produced by the condensation of phenolic compounds such as phenol, orthocresol, paracresol, 2,4-dimethylphenol, 2,6-dimethylphenol, and the like with terpenes such as pinene, camphene, tricyclene, limonene, and dipentene.

The invention is further explained by means of the following examples. The examples are for illustrative purposes only and are not to be considered a limitation of the invention.

*Example 1*

Experiments were made with a polyethylene prepared with the use of a Ziegler catalyst system obtained from titanium tetrachloride and aluminum triethyl.

0.1 or 0.2% by weight of the following stabilizers were added to specimens of this polymer.
A=sodium-n-cetyl thiosulfate
B=sodium-betahydroxycetyl thiosulfate
C=sodium-n-dodecyl thiosulfate The mixtures were milled at 160° C. for 30 or 60 minutes. The intrinsic viscosity and the melting index were then determined, while in order to assess the color the light reflection was measured in percentages of the reflection from a polymer specimen to which no stabilizer had been added and which was unmilled.

For comparison the same determinations were made with polymer specimens to which the stabilizers had been added, but which were unmilled.

ing for 10 minutes had an I.V. of 0.5. The sample inhibited with sodium n-cetyl thiosulfate after milling for 5 minutes had an I.V. of 1.8 and a reflectance of 80 and after milling for 15 minutes had an I.V. of 1.4 and a reflectance of 76.

In a comparison of the inhibiting properties of sodium n-cetyl thiosulfate with 16 other compounds of various types not in accordance with this invention, it was found that the best preservation of the reflectance of the sample was obtained with the sodium n-cetyl thiosulfate.

*Example 3*

Further improvements in reducing loss of intrinsic viscosity, while at the same time preserving high reflectance, are obtained by adding 0.1 to 0.5 percent of 2,5-di-tertiary butyl-4-methoxyphenol or of oxycresyl camphene as well as the thiosulfate ester or salt to the polymers of Examples 1 and 2 before milling.

*Example 4*

Similarly good results as shown in Examples 1 and 2 are obtained when inhibiting polymers produced from other Ziegler type catalyst systems, e.g. those utilizing as the heavy metal compound zirconium trichloride or tetrachloride or zirconium acetyl acetonate, salts of vanadium, chromium, tungsten and others and as the organo-metal compound aluminum triisobutyl, aluminum ethyl sesquichloride, and others.

Reactants, catalysts, and conditions useful in the production of Ziegler type low-pressure polyolefins are known in prior art. They are described, for example, in Belgian Patents Numbers 534,792 and 538,782 to Ziegler and Ziegler et al., respectively.

The following is a description of the several materials used in preparing the compositions according to this invention.

The feed is an alpha-monoolefin such as ethylene, propylene, butene-1, or mixtures thereof, and the like.

In general, Ziegler catalysts comprise the reaction products of (1) a compound of a transition metal selected from the metals in subgroups "a" of group IV, V and VI

| stabilizer | percent | I.V. | | | Melting Index | | | Reflection | | |
|---|---|---|---|---|---|---|---|---|---|---|
| | | unmilled | after milling for (minutes) | | unmilled | after milling for (minutes) | | unmilled | after milling for (minutes) | |
| | | | 30 | 60 | | 30 | 60 | | 30 | 60 |
| None | 0 | 2.42 | 1.45 | 1.23 | 0.29 | 1.24 | 6.31 | 86 | 90 | 87 |
| A | 0.1 | 2.52 | 2.61 | 2.00 | 0.26 | 0.27 | 0.42 | 85 | 83 | 87 |
| A | 0.2 | 2.21 | 2.10 | 2.04 | 0.30 | 0.33 | 0.33 | 91 | 91 | 91 |
| B | 0.2 | 2.65 | 2.40 | 2.45 | 0.30 | 0.34 | 0.37 | 92 | 92 | 91 |
| C | 0.2 | 2.65 | 2.70 | 2.40 | 0.26 | 0.24 | 0.26 | 92 | 90 | 85 |

It is clear that the thiosulfuric acid ester salts used in a 0.1 to 0.2% by weight concentration very effectively stabilize the polymer and there is no deterioration in the color of the product. Similarly good results are obtained when using the corresponding esters, dicetyl thiosulfate, didodecyl thiosulfate and bis(betahydroxycetyl) thiosulfate.

*Example 2*

In another experiment the polyolefin was a polypropylene prepared on a semi-commercial scale with the use of a low-pressure catalyst system obtained from gamma titanium trichloride and aluminum diethyl chloride.

To this polypropylene 0.15% by weight of sodium n-cetyl thiosulfate was added. The mixture was milled at 170° C. for 5 and 15 minutes.

The intrinsic viscosity of the original sample was 2.3 dl./g. An uninhibited sample after milling for 45 seconds had an I.V. of 1.8 and reflectance of 78 and after milland group VIII of the Mendeleev Periodic Table as illustrated on page 28 of Ephraim, "Inorganic Chemistry," 6th English edition, with (2) a component from the following groups which are, in general, considered strong reducing compounds: (a) a metal of group I of the Periodic Table or an alloy of such metal; (b) an organo-metallic compound of a group I–III metal, tin or lead, or a hydride of one of these metals; (c) an organo-boron compound; and (d) an aluminum halide in combination with aluminum metal.

Among the first group of reagents the preferred compounds are generally titanium tetra- or trihalides. Among the preferred compounds of the second group are:

(1) An aluminum trialkyl;
(2) An aluminum compound of the general formula $R_1R_2AlX$, wherein $R_1$ and $R_2$ are similar or dissimilar and each represents a hydrogen atom or a hydrocarbon radical such as an alkyl, alkaryl, aryl, aralkyl, alkenyl, alkynyl, cycloalkyl or cycloalkenyl radical and X represents a hydrogen atom, a halogen atom, an alkoxy group or an aryloxy group or the residue of a secondary amine or an amide, a mercaptan, a thiophenol, a carboxylic acid or a sulfonic acid;

(3) An aluminum compound of the general formula $RAlX_1X_2$, wherein R represents a hydrogen atom or a hydrocarbon radical as in (2) above and $X_1$ and $X_2$ are similar or dissimilar and each represents a halogen atom, an alkoxy group or an aryloxy group.

The term "organo-metallic compound" means a compound in which the metal is directly attached to a carbon atom. The organo-metallic compound may be present in the form of a molecular compound with an ether, thioether or amine or a complex compound with an alkali metal hydride, alkali metal alkyl or alkali metal aryl.

The second component of the catalyst is preferably an organo-metallic compound in which a hydrocarbon radical (preferably an alkyl radical) is attached to the metal. In the case of those organo-metallic compounds which are derived from polyvalent metals the remaining valency or valencies may be satisfied by hydrocarbon radicals, alkoxy or aryloxy radicals or halogen atoms.

The methods of preparing Ziegler polymers by use of these catalysts are now well known in the art and need not be further described herein.

I claim as my invention:

1. A composition comprising a solid polymer of an alpha-monoolefin selected from the group consisting of ethylene and propylene produced by a low-pressure polymerization process and less than about 1% by weight of a compound having the formula $(RS_2O_3)_nX$ wherein: X represents a radical of the group consisting of alkali metals, alkaline earth metals, zinc, cadmium, and an organic group R'; R and R' each represents an organic radical selected from the group consisting of alkyl, cycloalkyl, and aryl groups and alkyl-substituted, hydroxy-substituted, and halogen-substituted alkyl, cycloalkyl, and aryl groups; "$n$" is an integer which is the same as the valence of X; said compound $(RS_2O_3)_nX$ containing at least 6 carbon atoms and the groups R and R' containing from 3 to 20 carbon atoms each.

2. A composition according to claim 1 wherein said radical X is a metal.

3. A composition according to claim 1 wherein said radical X is sodium.

4. A composition according to claim 1 wherein said radical X is zinc.

5. A composition according to claim 1 wherein said alpha-monoolefin is ethylene.

6. A composition according to claim 1 wherein said alpha-monoolefin is propylene.

7. A stabilized polyethylene comprising solid polyethylene produced by a low-pressure polymerization process in which ethylene is polymerized with a catalyst obtained from titanium polychloride and aluminum alkyl and less than about 1% by weight of a compound having the formula $(RS_2O_3)_nX$, wherein: X represents a radical of the group consisting of alkali metals, alkaline earth metals, zinc, cadmium, and an organic group R'; R and R' each represents an organic radical selected from the group consisting of alkyl, cycloalkyl, and aryl groups and alkyl-substituted, hydroxy-substituted, and halogen-substituted alkyl, cycloalkyl, and aryl groups; "$n$" is an integer which is the same as the valence of X; said compound $(RS_2O_3)_nX$ containing at least 6 carbon atoms and the groups R and R' containing from 3 to 20 carbon atoms each.

8. A stabilized polyethylene according to claim 7 wherein said compound $(RS_2O_3)_nX$ is a sodium alkyl thiosulfate having from 6 to 20 carbon atoms in the alkyl group.

9. A stabilized polypropylene comprising solid polypropylene produced by a low-pressure polymerization process in which propylene is polymerized with a catalyst obtained from titanium polychloride and aluminum alkyl and less than about 1% by weight of a compound having the formula $(RS_2O_3)_nX$, wherein: X represents a radical of the group consisting of alkali metals, alkaline earth metals, zinc, cadmium, and an organic group R'; R and R' each represents an organic radical selected from the group consisting of alkyl, cycloalkyl, and aryl groups and alkyl-substituted, hydroxy-substituted, and halogen-substituted alkyl, cycloalkyl, and aryl groups; "$n$" is an integer which is the same as the valence of X; the compound $(RS_2O_3)_nX$ containing at least 6 carbon atoms and the groups R and R' containing from 3 to 20 carbon atoms each.

10. A stabilized polypropylene according to claim 9 wherein said compound $(RS_2O_3)_nX$ is a sodium alkyl thiosulfate having from 6 to 20 carbon atoms in the alkyl group.

11. A stabilized polyethylene comprising solid polyethylene produced by a low-pressure polymerization process combined with from 0.01 to 1% by weight of sodium cetyl thiosulfate.

12. A stabilized polyethylene comprising solid polyethylene produced by a low-pressure polymerization process combined with from 0.01 to 1% by weight of sodium beta-hydroxycetyl thiosulfate.

13. A stabilized polypropylene comprising solid polypropylene produced by a low pressure polymerization process combined with from 0.1 to 1% by weight of sodium-n-cetyl thiosulfate.

References Cited in the file of this patent

UNITED STATES PATENTS

| | | |
|---|---|---|
| 2,227,985 | Swan | Jan. 7, 1941 |
| 2,677,617 | Thompson | May 4, 1954 |
| 2,917,479 | Raamsdonk et al. | Dec. 15, 1959 |
| 2,925,398 | Coran et al. | Feb. 16, 1960 |